(12) United States Patent
Liu et al.

(10) Patent No.: US 11,496,550 B2
(45) Date of Patent: Nov. 8, 2022

(54) METHOD, SYSTEM, AND COMPUTER PROGRAM PRODUCT FOR DEPLOYING APPLICATION

(71) Applicant: EMC IP Holding Company LLC, Hopkinton, MA (US)

(72) Inventors: Jinpeng Liu, Shanghai (CN); Jin Li, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 155 days.

(21) Appl. No.: 17/105,030

(22) Filed: Nov. 25, 2020

(65) Prior Publication Data

US 2022/0141282 A1  May 5, 2022

(30) Foreign Application Priority Data

Oct. 29, 2020 (CN) .......................... 202011182682.4

(51) Int. Cl.
*H04L 67/10* (2022.01)
*H04L 41/12* (2022.01)
(Continued)

(52) U.S. Cl.
CPC .............. *H04L 67/10* (2013.01); *G06N 5/04* (2013.01); *G06N 20/00* (2019.01); *H04L 41/12* (2013.01)

(58) Field of Classification Search
None
See application file for complete search history.

(56) References Cited

U.S. PATENT DOCUMENTS 11,360,689 B1 * 6/2022 Grunwald ............... G06F 3/065
11,366,984 B1 * 6/2022 Ni ......................... G06V 30/248
(Continued)

FOREIGN PATENT DOCUMENTS

WO  WO-2019089116 A1 *  5/2019  .......... G06F 16/215
WO  WO-2019089469 A1 *  5/2019  .......... G06F 3/04817

OTHER PUBLICATIONS

Wikipedia, "Intermediate Representation," https://en.wikipedia.org/w/index.php?title=Intermediate_representation&direction=next&oldid=905361000, Jan. 24, 2020, 4 pages.
(Continued)

*Primary Examiner* — Jeffrey R Swearingen
(74) *Attorney, Agent, or Firm* — Ryan, Mason & Lewis, LLP

(57) ABSTRACT

Methods, systems, and computer program products for deploying an application. One method includes acquiring a computational graph corresponding to an application. The computational graph includes a plurality of nodes corresponding to operations performed by the application, the nodes including at least one input node for exchanging data with at least one terminal device and at least one computational node for processing data. The at least one input node is deployed to a first group of edge nodes co-located with a first base station serving the at least one terminal device, and the at least one computational node is deployed to a second group of edge nodes co-located with an area data center. Illustrative embodiments of the present disclosure enable an input node to be as close to a user as possible, thereby achieving low response delays while meeting the requirements of a computational node for storage and computational resources.

20 Claims, 6 Drawing Sheets

(51) Int. Cl.
G06N 20/00 (2019.01)
G06N 5/04 (2006.01)

(56) References Cited

U.S. PATENT DOCUMENTS

2019/0324810 A1 10/2019 Zhao et al.
2020/0334083 A1 10/2020 Liu et al.
2020/0334544 A1 10/2020 Liu et al.

OTHER PUBLICATIONS

Jia et al., "Beyond Data and Model Parallelism for Deep Neural Networks," Proceedings of the 2nd SysML Conference, Palo Alto, CA, Jul. 2018, 13 pages.
Wikipedia, "Deep Learning," https://en.wikipedia.org/wiki/Deep_learning, Feb. 6, 2020, 33 pages.
Wikipedia, "Everything as a Service," https://simple.wikipedia.org/wiki/Everything_as_a_service, Aug. 23, 2019, 2 pages.
L. Song et al., "HyPar: Towards Hybrid Parallelism for Deep Learning Accelerator Array," arXiv:1901,02067v1, Jan. 7, 2019, 13 pages.
Github, "OpenNESS Architecture and Solution Overview," https://github.com/open-ness/specs/blob/master/doc/architecture.md, accessed Jul. 7, 2020, 15 pages.
Amazon Web Services, "Machine Learning Inference with AWS IoT Greengrass Solution Accelerator" https://aws.amazon.com/iot/solutions/mli-accelerator/, Oct. 2019, 5 pages.
Etsi, "MEC in 5G Networks," White Paper No. 28, ISBN No. 979-10-92620-22-1, Jun. 2018, 28 pages.
Etsi, "Multi-access Edge Computing (MEC); Phase 2: Use Cases and Requirements," Group Specification MEC 002 V2.1.1, Oct. 2018, 66 pages.
Etsi, "Multi-access Edge Computing (MEC); Framework and Reference Architecture," Group Specification MEC 003 V2.1.1, Jan. 2019, 21 pages.
Etsi, "Multi-access Edge Computing (MEC); Application Mobility Service API," Group Specification MEC 021 V2.1.1, Jan. 2020, 47 pages.
3GPP "3rd Generation Partnership Project; Technical Specification Group Core Network and Terminals; Interface between the Control Plane and the User Plane Nodes; Stage 3," Technical Specification 29.244 V16.2.0, Dec. 2019, 281 pages.
3GPP "3rd Generation Partnership Project; Technical Specification Group Services and System Aspects; System architecture for the 5G System (5GS); Stage 2," Technical Specification 23.501 V16.3.0, Dec. 2019, 417 pages.
3GPP "3rd Generation Partnership Project; Technical Specification Group Services and System Aspects; Procedures for the 5G System (5GS); Stage 2," Technical Specification 23.502 V16.3.0, Dec. 2019, 558 pages.
3GPP "3rd Generation Partnership Project; Technical Specification Group Core Network and Terminals; 5G System; Session Management Policy Control Service; Stage 3," Technical Specification 29.512 V16.3.0, Dec. 2019, 178 pages.
3GPP "3rd Generation Partnership Project; Technical Specification Group Core Network and Terminals; 5G System; Network Exposure Function Northbound APIs; Stage 3," Technical Specification 29.522 V16.2.0, Dec. 2019, 106 pages.
U.S. Appl. No. 16/678,758 filed in the name of Jinpeng Liu et al. filed Nov. 8, 2019, and entitled "Method, Electronic Device and Computer Program Product for Processing Machine Learning Model."
U.S. Appl. No. 16/789,006 filed in the name of Jin Li et al. filed Feb. 12, 2020, and entitled "Scheduling Artificial Intelligence Model Partitions Based on Reversed Computation Graph."
U.S. Appl. No. 16/823,445 filed in the name of Jinpeng Liu et al. filed Mar. 19, 2020, and entitled "Task Scheduling Method, Electronic Device, and Computer Storage Medium."
U.S. Appl. No. 16/845,682 filed in the name of Jin Li et al. filed Apr. 10, 2020, and entitled "Task Processing Method, Electronic Device, and Computer Program Product."
U.S. Appl. No. 16/925,864 filed in the name of Jinpeng Liu et al. filed Jul. 10, 2020, and entitled "Managing Artificial Intelligence Model Partitions for Edge Computing Environment."

* cited by examiner

METHOD, SYSTEM, AND COMPUTER PROGRAM PRODUCT FOR DEPLOYING APPLICATION

RELATED APPLICATION(S)

The present application claims priority to Chinese Patent Application No. 202011182682.4, filed Oct. 29, 2020, and entitled "Method, System, and Computer Program Product for Deploying Application," which is incorporated by reference herein in its entirety.

FIELD

Embodiments of the present disclosure generally relate to the field of edge computing, and in particular, to a method, a system, and a computer program product for deploying an application.

BACKGROUND

Edge computing is the evolution of cloud computing, which migrates the deployment of applications from a centralized data center downward to distributed edge nodes, thereby achieving shorter distances from data generated by consumers and the applications. Edge computing is considered as one of the important technologies for meeting 5G key performance indicators (especially in terms of low delays and bandwidth efficiency). The 3GPP 5G system specification allows a multi-access edge computing (MEC) system and a 5G system to cooperate in operations related to traffic directing and policy controls. An MEC system can be integrated with a 5G system to create a powerful environment for edge computing. In a system architecture where a 5G system and an MEC system are integratedly deployed, a data plane of a 5G core network can be implemented by a user plane function network element (also referred to as local UPF) inside the MEC system.

SUMMARY

Embodiments of the present disclosure provide to a method, a system, and a computer program product for deploying an application.

In a first aspect of the present disclosure, a method for deploying an application is provided. The method includes: acquiring a computational graph corresponding to an application, the computational graph including a plurality of nodes corresponding to operations performed by the application, and the plurality of nodes including at least one input node for exchanging data with at least one terminal device and at least one computational node for processing data; deploying the at least one input node to a first group of edge nodes co-located with a first base station serving the at least one terminal device; and deploying the at least one computational node to a second group of edge nodes co-located with an area data center.

In a second aspect of the present disclosure, a system for deploying an application is provided. The system includes at least one processing unit and at least one memory. The at least one memory is coupled to the at least one processing unit and stores instructions for execution by the at least one processing unit. The instructions, when executed by the at least one processing unit, causes the system to perform actions. The actions include: acquiring a computational graph corresponding to an application, the computational graph including a plurality of nodes corresponding to operations performed by the application, and the plurality of nodes including at least one input node for exchanging data with at least one terminal device and at least one computational node for processing data; deploying the at least one input node to a first group of edge nodes co-located with a first base station serving the at least one terminal device; and deploying the at least one computational node to a second group of edge nodes co-located with an area data center.

In a third aspect of the present disclosure, a computer program product is provided. The computer program product is tangibly stored in a computer storage medium and includes machine-executable instructions. The machine-executable instructions, when executed by a device, cause the device to implement any step of the method described according to the first aspect of the present disclosure.

In a fourth aspect of the present disclosure, a computer-readable storage medium is provided, which includes machine-executable instructions; and the machine-executable instructions, when executed by a device, cause the device to perform any step of the method described according to the first aspect of the present disclosure.

This Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent from the description below of example embodiments of the present disclosure, to be viewed with reference to the accompanying drawings. In the example embodiments of the present disclosure, the same reference numerals generally represent the same components.

In the accompanying drawings, the same or corresponding numerals represent the same or corresponding parts.

DETAILED DESCRIPTION

Figure 1:
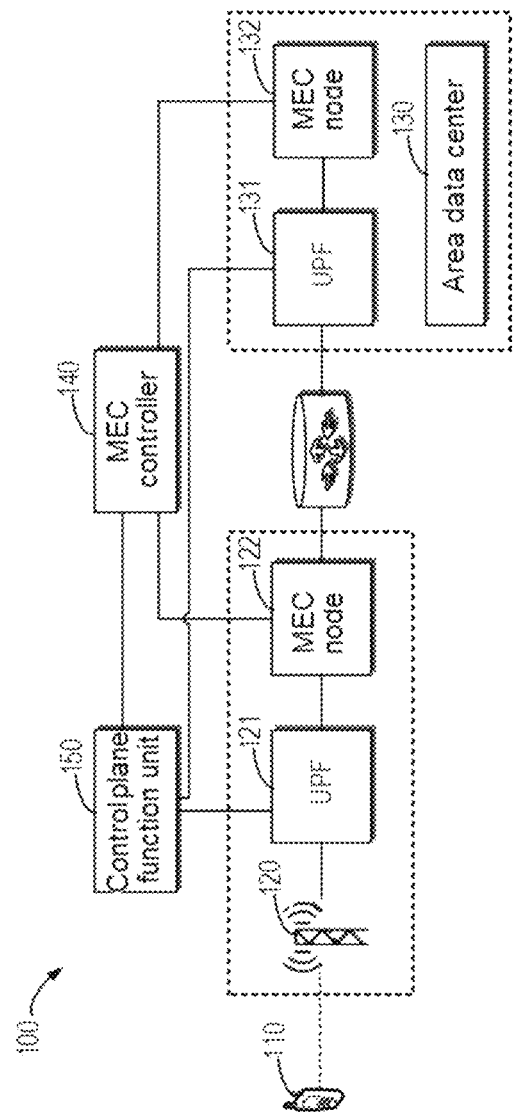
FIG. 1 shows a schematic diagram of an example system in which an embodiment of the present disclosure may be implemented.

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like may refer to different or the same objects. Other explicit and implicit definitions may also be included below.

As mentioned above, the 3GPP 5G system specification allows the integrated deployment of an MEC system and a 5G system. For example, an MEC system and its local UPF may be co-located with a base station, with a transmission node, with a network sink node, or with a core network function network element (for example, located in the same area network center). In these deployment modes, an application is usually deployed in a single physical MEC node, which may result in the following problems.

For example, if the application is deployed to an MEC node co-located with a base station, the application may be as close to a user as possible, thereby reducing response delays. However, computations performed by the application may require large amounts of storage and computational resources. Storage and computational resources at the base station are usually limited and may not meet the requirements of the application. Even if the storage and computational resources at the base station can meet the requirements of the application, the computations performed by the application will occupy the base station's resources for processing radio access network (RAN) events, thereby affecting the RAN performance.

For another example, if the application is deployed to an MEC node co-located with a data center, storage and computational resources required by the application may be met. However, since the data center is usually far from a user, response delays of the application become large. For some applications with high real-time requirements (for example, automatic driving applications), long response delays may be unacceptable.

Operations of different parts of the application often have different requirements. For example, operations for interacting with users often have a high requirement for low delays, while operations for processing data have a high requirement for storage and computational resources. However, deploying an application to a single MEC edge node makes it impossible to implement separate policy controls for operations of different parts of the application.

In addition, it may be necessary in some cases to migrate an application from one MEC node (referred to as "original MEC node") to another MEC node (referred to as "target MEC node"). This often requires at least the following operations: reallocating resources for the application on the target MEC node, starting a new application instance on the target MEC node, synchronizing the state between an old instance and the new instance of the application so as to continue the application services suspended on the original MEC node, and recycling resources occupied by the old instance from the original MEC node. For applications with high real-time requirements, such as automatic driving, a long service interruption time caused by the above migration process may be unacceptable.

Embodiments of the present disclosure provide a solution for deploying an application. In this solution, a computational graph corresponding to an application is acquired. The computational graph includes a plurality of nodes corresponding to operations performed by the application, where the plurality of nodes includes at least one input node for exchanging data with a terminal device and at least one computational node for processing data. The at least one input node is deployed to an edge node co-located with a base station serving the terminal device, and the at least one computational node is deployed to an edge node co-located with an area data center. When the terminal device migrates from an original cell served by an original base station to a target cell served by a target base station, the at least one input node may be migrated to an edge node co-located with the target base station, and the at least one computational node does not need to be migrated.

In this way, the embodiments of the present disclosure can implement different policy controls for the input node and the computational node of the application. The embodiments of the present disclosure enable an input node to be as close to a user as possible, thereby achieving relatively low response delays while meeting the requirements of a computational node for storage and computational resources. In addition, upon migrating of an application, only input nodes, but no computational nodes, need to be migrated. This can shorten a service interruption time caused by application migration, thereby improving the user experience.

The embodiments of the present disclosure will be further described below in detail with reference to the accompanying drawings. FIG. 1 shows a block diagram of example system 100 in which an embodiment of the present disclosure can be implemented. It should be understood that the structure of system 100 is described for illustrative purposes only and does not imply any limitation to the scope of the present disclosure.

As shown in FIG. 1, system 100 includes terminal device 110, base station 120, one or more MEC nodes 122 co-located with base station 120 and local UPF 121 thereof, area data center 130, and one or more MEC nodes 132 co-located with area data center 130 and local UPF 131 thereof. MEC nodes 122 and 132 may be managed by MEC controller 140. In addition, UPFs 121 and 131 may be managed by, for example, a control plane function unit 150 in a 5G core network.

Terminal device 110 can be user equipment (UE) or any terminal having wired or wireless communication functions, including, but not limited to, mobile phones, computers, personal digital assistants, game consoles, wearable devices, in-vehicle communication equipment, machine type communication (MTC) equipment, device-to-device (D2D) communication equipment, vehicle-to-everything (V2X) communication equipment, sensors, etc. The term terminal device can be used interchangeably with UE, a mobile station, a subscriber station, a mobile terminal, a user terminal, or a wireless device.

Base station 120 may be a network node, for example, a Node B (Node B, or NB), an evolved Node B (eNodeB or eNB), a next-generation Node B (gNB), a basic transceiver station (BTS), a base station (BS), a base station subsystem (BSS), or the like. For the purpose of illustration and not limitation, the gNB will be used herein as an example of base station 120 to describe the embodiments of the present disclosure.

MEC controller 140 and MEC nodes 122 and 132 may be implemented using any device with a computing function (for example, example device 600 shown in FIG. 6), and comply with the MEC standard established by the European Telecommunications Standards Institute (ETSI).

Figure 2:
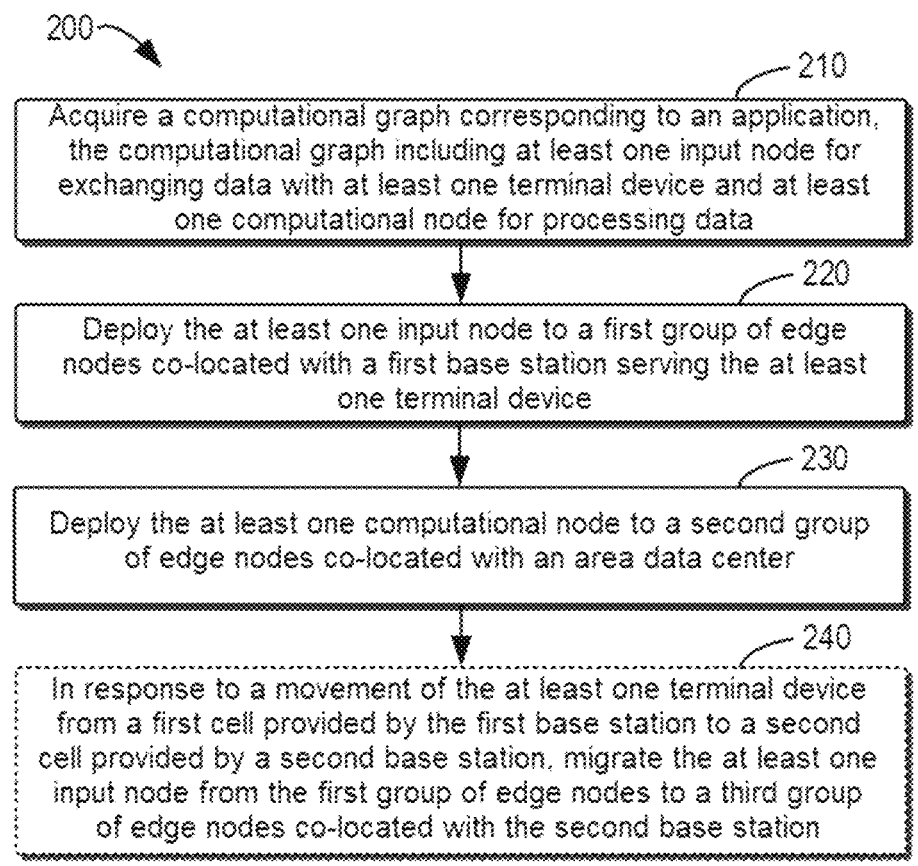
FIG. 2 shows a flowchart of an example method for deploying an application according to an embodiment of the present disclosure.

FIG. 2 shows a flowchart of example method 200 for deploying an application according to an embodiment of the present disclosure. It should be understood that method 200 may further include additional actions not shown and/or may omit actions shown, and the scope of the present disclosure is not limited in this regard.

At block 210, a computational graph corresponding to an application is acquired. In some embodiments, the application may be an application that performs inference tasks by using a machine learning model (for example, a deep learning model) and based on data from a terminal device, for example, but not limited to, automatic driving applications, mobile game applications, etc. The computational graph may include a plurality of nodes corresponding to operations performed by the application.

Figure 3:
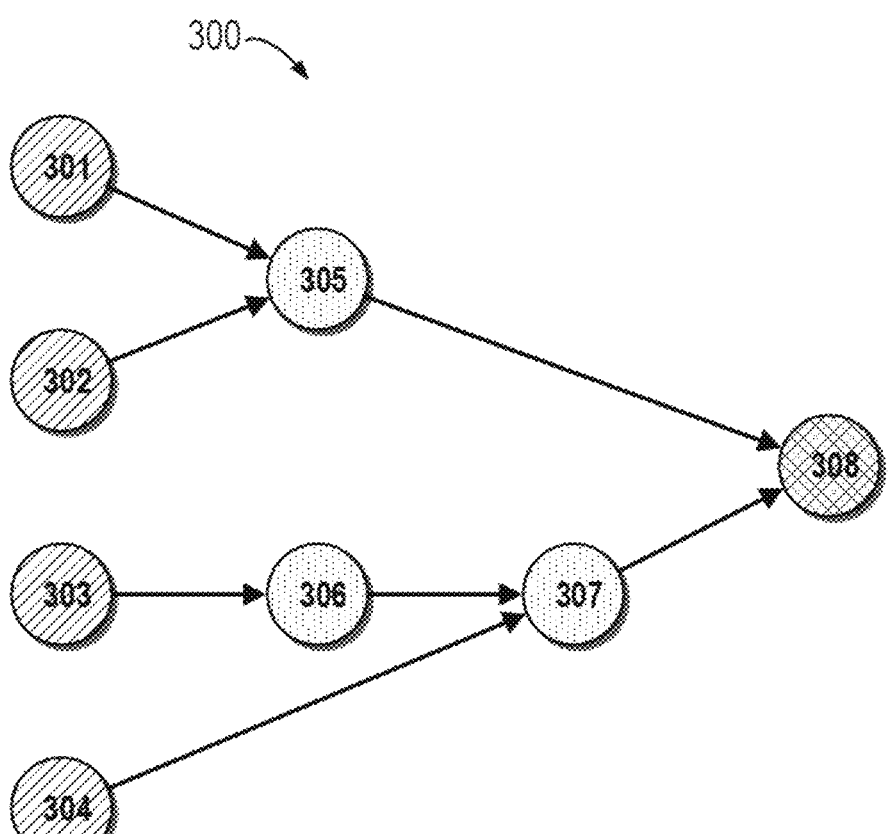
FIG. 3 shows an example computational graph corresponding to an application according to an embodiment of the present disclosure.

FIG. 3 shows example computational graph 300 corresponding to an application according to an embodiment of the present disclosure. As shown in FIG. 3, computational graph 300 may include input nodes 301-304 for receiving data from a data source (for example, a terminal device); computational nodes 305-307 for performing neuron network computations (for example, convolution operations, matrix operations, etc.); and output node 308 for returning operation results to a user or for sending operation results to a data center for further processing. When output node 308 is used to return operation results to a user, the output node can be regarded as an input node; and when output node 308 is used to send operation results to a data center for further processing, the output node can be regarded as a computational node. That is, the computational graph corresponding to an application may include two types of nodes: at least one input node for exchanging data with a terminal device and at least one computational node for processing data.

At block 220, the at least one input node is deployed to a first group of edge nodes co-located with a base station (referred to herein as "first base station") serving a terminal device. In this way, the input node is enabled to be as close to a user as possible, thereby reducing response delays of the application. At block 230, the at least one computational node is deployed to a second group of edge nodes co-located with an area data center. In this way, the requirements of the computational node for storage and computational resources can be met.

In order to implement the deployment of applications on two levels of edge nodes (that is, edge nodes co-located with a base station and edge nodes co-located with an area data center), the embodiments of the present disclosure provide a model parallelization system architecture for edge computing.

Figure 4:
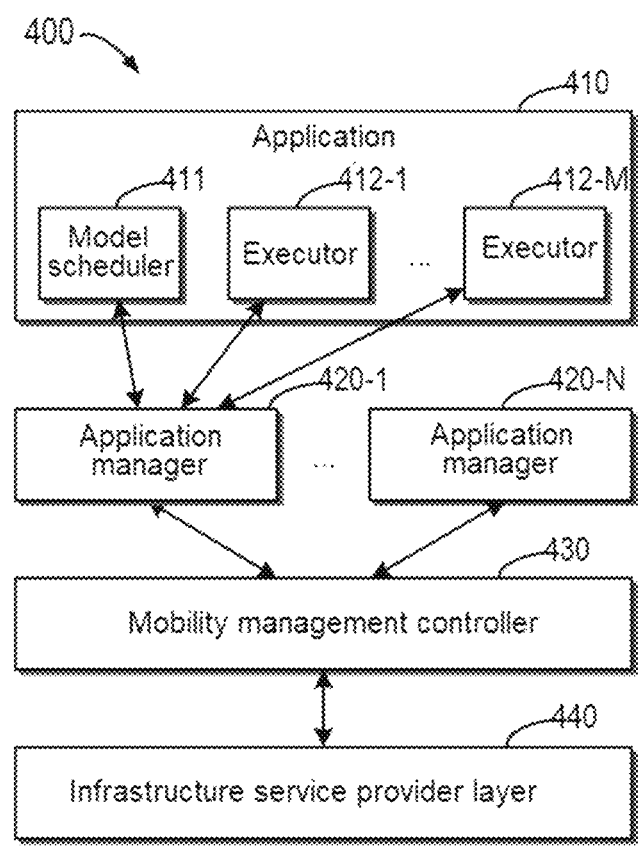
FIG. 4 shows a block diagram of a model parallelization system for edge computing according to an embodiment of the present disclosure.

FIG. 4 shows an example block diagram of model parallelization system architecture 400 for edge computing according to an embodiment of the present disclosure. System architecture 400 includes application 410 that uses a machine learning model to perform inference tasks, where the application may include model scheduler 411 and executors 412-1, . . . , 412-M (collectively or individually referred to as executor 412). System architecture 400 further includes mobility management controller 430 for a specific type of applications and application managers 420-1, . . . , 420-N (collectively or individually referred to as application manager 420) for managing different instances of the specific type of applications. For example, application manager 420-1 is used to manage application 410, and other application managers 420 up to and including application manager 420-N are used to manage other applications of the same type (such other applications are not shown in FIG. 4). System architecture 400 further includes infrastructure service provider layer 440.

Infrastructure service provider layer 440 is used to provide basic platform services (such as application deployment/lifecycle management and enhanced hardware-aware architecture) and 3GPP 5G/MEC services (such as UPF selection and policy control functions) to an upper layer. For example, infrastructure service provider layer 440 may be implemented by using Intel's Open-NESS platform or platforms from other providers.

Mobility management controller 430, in some embodiments illustratively implemented as a mobility management policy controller (MMPC) 430, corresponds to a specific type of application or applications. Since each type of application or applications usually has a specific computational graph, a specific UPF control policy for selecting a UPF for an input node, and a specific application mobility control policy for a computational node, different types of applications may correspond to different MMPCs.

Each application manager 420 will correspond to a specific application instance under a specific type, and is used to implement instruction and data conversion between the specific application instance and an underlying service. All application managers in the same type of applications are all under the control of a single MMPC of that type.

Model scheduler 411 and executor 412 can implement a model parallelization algorithm. In some embodiments, model scheduler 411 may divide models used by an application to obtain input nodes and computational nodes as shown in FIG. 3. Model scheduler 411 may assign the divided nodes to corresponding executors 412 for execution. Model scheduler 411 may be implemented as a remote procedure call (RPC) server, and each executor 412 may be implemented as an RPC client terminal. The RPC client terminal of each executor 412 may execute operations of one or more nodes according to a request sent by an RPC server.

In some embodiments, in order to implement the deployment of applications on two levels of edge nodes, executor 412 for executing an input node may be deployed to an edge node (for example, MEC node 122 shown in FIG. 1) co-located with a base station, and executor 412 for executing a computational node may be deployed to an edge node (for example, MEC node 132 shown in FIG. 1) co-located with an area data center.

In some embodiments, model scheduler 411 may be deployed, for example, to MEC controller 140 as shown in FIG. 1, or deployed to a suitable MEC node (for example, MEC node 132 co-located with area data center 130). Application manager 420 may be deployed, for example, to MEC controller 140, for example, as shown in FIG. 1, or deployed to a suitable MEC node (for example, MEC node 132 co-located with area data center 130). MMPC 430 may be deployed, for example, to MEC controller 140 shown in FIG. 1. In some embodiments, one or more of model scheduler 411, application manager 420, and MMPC 430 may be implemented by using the same physical device.

Figure 5A:
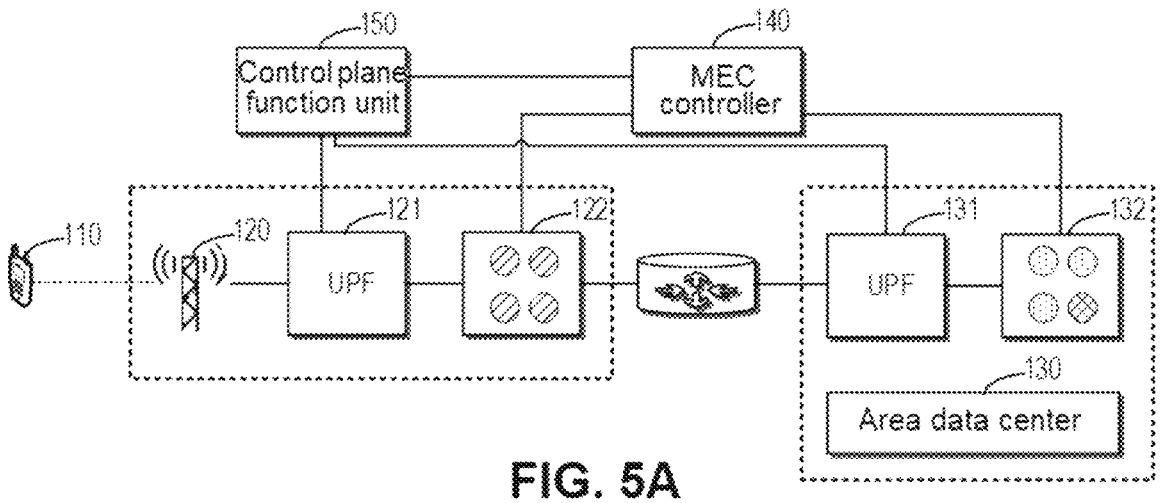
FIG. 5A shows a schematic diagram of deployment of applications on two levels of edge nodes according to an embodiment of the present disclosure.

FIG. 5A shows a schematic diagram of deployment of applications on two levels of edge nodes according to an embodiment of the present disclosure. FIG. 5A uses system 100 shown in FIG. 1 as an example for description. For example, for computational graph 300 shown in FIG. 3, input nodes 301 to 304 are deployed to MEC node 122 co-located with base station 120, and computational nodes 305-307 are deployed to MEC node 132 co-located with area data center 130. It is assumed here that output node 308 is used to send operation results to a data center for further processing, and therefore, it is regarded as a computational node. As shown in FIG. 5A, output node 308 is also deployed to MEC node 132 co-located with area data center 130.

In addition to deploying executor 412 executing input nodes 301-304 to MEC node 122 co-located with base station 120 and deploying executor 412 executing computational nodes 305-308 to MEC node 132 co-located with area data center 130, in order to achieve traffic routing and directing, it is necessary to establish a data path (also referred to herein as "first data path") between terminal device 110 and MEC node 122 and a data path (also referred to herein as "second data path") between MEC node 122 and MEC node 132.

In some embodiments, MMPC 430 may subscribe to an internet service provider (ISP) for notifications of network events related to an associated protocol data unit (PDU) session, and register its UPF selection policy to a 5G core network according to the notifications, so as to support traffic routing and directing.

Specifically, application manager 420-1 may configure application 410 managed thereby to infrastructure service provider layer 440, for example, specifying which terminal device an input comes from and whether an output goes to a terminal device or a data center. Model scheduler 411 may acquire the above configuration forwarded by MMPC 430 and application manager 420-1. Model scheduler 411 may determine an association relationship between an input node and terminal device 110 by analyzing a computational graph, and send the relationship to MMPC 430. MMPC 430 selects a UPF for an input node deployed near base station 120 by following a process defined in the 3GPP specification. For example, MMPC 430 may interact as an application function network element (AF) with a policy control function network element (PCF), so as to request traffic directing by sending an identifier of terminal device 110 and an identifier of MEC node 122 where the input node is located. The PCF can convert the request into a suitable UPF selection policy and provide routing rules to a suitable session management function network element (SMF). The SMF identifies a target UPF (if any) for terminal device 110 and MEC node 122, and initiates the configuration of traffic rules. If no applicable UPF is present, the SMF may insert one or more UPFs into a data path of a PDU session, so as to establish a first data path between terminal device 110 and MEC node 122. Model scheduler 411 may analyze a computational graph to determine an association relationship between an input node and a computational node, and send the relationship to MMPC 430. MMPC 430 may perform steps similar to establishing the first data path to establish a second data path between MEC node 122 and MEC node 132 where the computational node is deployed.

Returning to FIG. 2, for example, in a case where an application mobility policy is enabled, at block 240, in response to a movement of a terminal device from a first cell provided by a first base station to a second cell provided by a second base station, at least one input node is migrated from a first group of edge nodes co-located with the first base station to a third group of edge nodes co-located with the second base station.

Figure 5B:
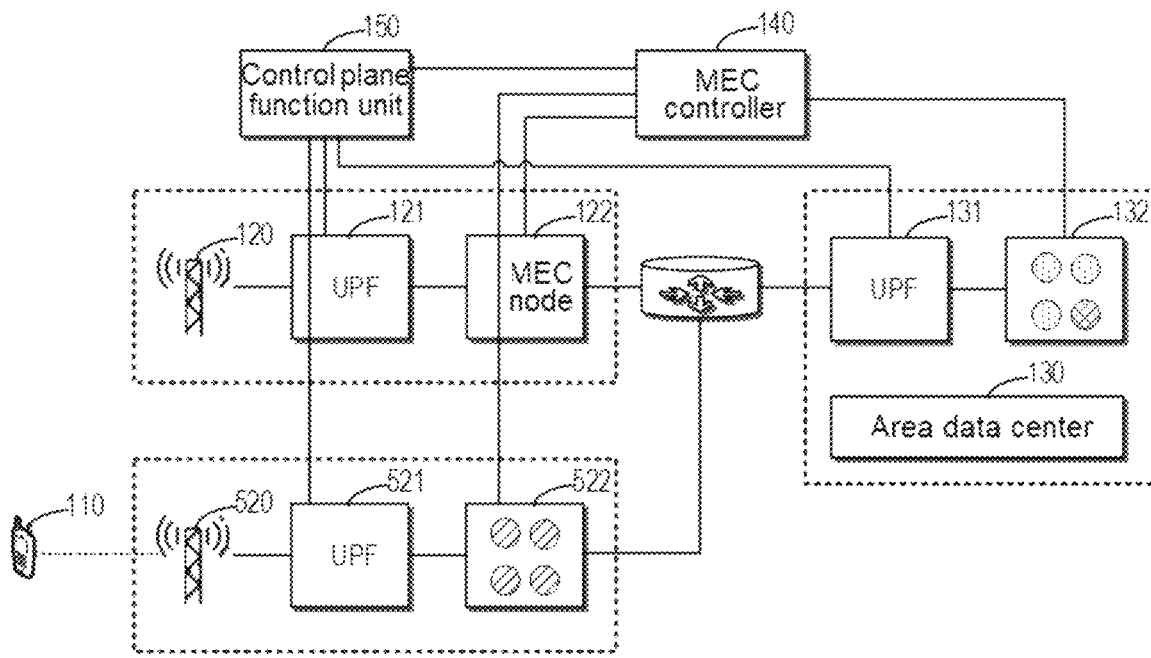
FIG. 5B shows a schematic diagram of application migration according to an embodiment of the present disclosure.

FIG. 5B shows a schematic diagram of application migration according to an embodiment of the present disclosure. FIG. 5B uses system 100 shown in FIG. 1 as an example for description. As shown in FIG. 5B, for example, terminal device 110 moves from a cell provided by base station 120 to a cell provided by base station 520. In this case, input nodes 301-304 deployed to MEC node 122 may be migrated to MEC node 522 co-located with base station 520 and UPF 521.

In addition to migrating executor 412 executing input nodes 301-304 to MEC node 522 co-located with base station 520, in order to achieve traffic routing and directing, it is necessary to establish a data path (also referred to herein as "third data path") between terminal device 110 and MEC node 522 and a data path (also referred to herein as "fourth data path") between MEC node 522 and MEC node 132.

In some embodiments, MMPC 430 may receive a notification (which may be received from a 5G core network) from an ISP, the notification indicating that location of terminal device 110 has moved from one cell to another cell. MMPC 430 may create an application manager and its associated inference application instance on new MEC node 522. MMPC 430 may trigger the migration of executor 412 executing input nodes 301-304 from MEC node 122 to MEC node 522. It should be understood that the migration of an RPC client terminal is easy. MMPC 430 can establish the third data path between terminal device 110 and MEC node 522 where an input node is located and the fourth data path between MEC node 522 and MEC node 132 where a computational node is deployed. The specific establishing process is similar to the foregoing establishing processes for the first data path and the second data path, details of which are not described again herein. Then, MMPC 430 may use an application programming interface provided by the ISP to terminate an application including input nodes deployed at MEC node 122, and recycle the resources occupied by the application in MEC node 122. After successful establishment of the third data path between terminal device 110 and the input node deployed at MEC node 522 and the fourth data path between the input node deployed at MEC node 522 and the computational node deployed at MEC node 132, the migrated application can continue to provide services to users.

As can be seen from the above description, illustrative embodiments of the present disclosure provide a solution for deploying an application. In this solution, a computational graph corresponding to an application is acquired. The computational graph includes a plurality of nodes corresponding to operations performed by the application, where the plurality of nodes includes at least one input node for exchanging data with a terminal device and at least one computational node for processing data. The at least one input node is deployed to an edge node co-located with a base station serving the terminal device, and the at least one computational node is deployed to an edge node co-located with an area data center. When the terminal device migrates from an original cell served by an original base station to a target cell served by a target base station, the at least one input node may be migrated to an edge node co-located with the target base station, and the at least one computational node does not need to be migrated.

In this way, the embodiments of the present disclosure can implement different policy controls for the input node and the computational node of the application. The embodiments of the present disclosure enable an input node to be as close to a user as possible, thereby achieving relatively low response delays while meeting the requirements of a computational node for storage and computational resources. In addition, upon migrating of an application, only input nodes, but no computational nodes, need to be migrated. This can shorten a service interruption time caused by application migration, thereby improving the user experience.

Figure 6:
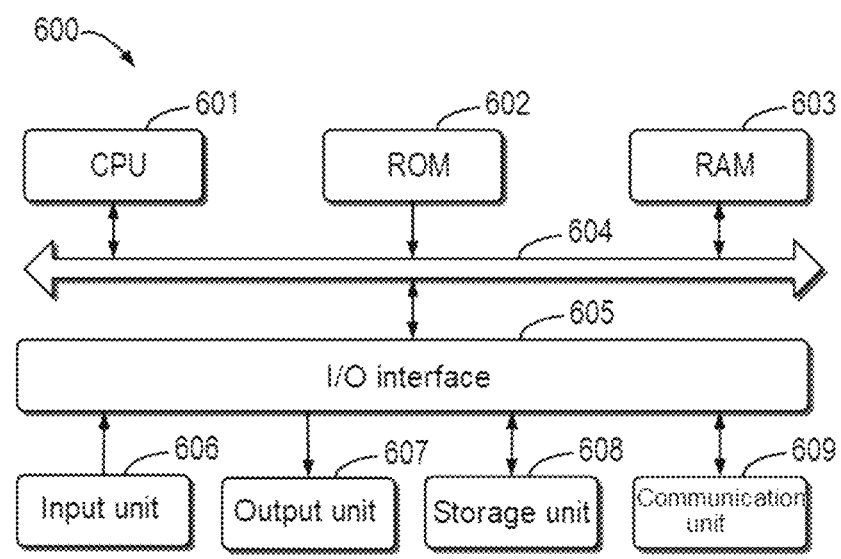
FIG. 6 shows a schematic block diagram of an example device that may be configured to implement an embodiment of the present disclosure.

FIG. 6 shows a schematic block diagram of example device 600 that may be configured to implement an embodiment of the present disclosure. One or more of various devices, functional units, managers, controllers, MEC nodes, etc. shown in FIG. 1 to FIG. 5B may be implemented using device 600. As shown in FIG. 6, device 600 includes central processing unit (CPU) 601 that may perform various suitable actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to one another through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

Various processes and processing described above, for example, method 200, may be performed by CPU 601. For example, in some embodiments, method 200 may be implemented as a computer software program that is tangibly included in a machine-readable medium, such as storage unit 608. In some embodiments, part or all of the computer program may be loaded and/or installed to device 600 via ROM 602 and/or communication unit 609. When the computer program is loaded to RAM 603 and executed by CPU 601, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any appropriate combination thereof. More specific examples (a non-exhaustive list) of the computer-readable storage medium include: a portable computer disk, a hard disk drive, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any appropriate combination thereof. The computer-readable storage medium used herein is not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer may be connected to a user's computer through any type of networks, including a local area network (LAN) or a wide area network (WAN), or may be connected to an external computer (for example, connected through the Internet by using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented using computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the accompanying drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, the program segment, or the part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Example embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, and to otherwise enable persons of ordinary skill in the art to understand the embodiments disclosed herein.

What is claimed is:

1. A method for deploying an application, comprising:
acquiring a computational graph corresponding to an application, the computational graph comprising a plurality of nodes corresponding to operations performed by the application, and the plurality of nodes comprising at least one input node for exchanging data with at least one terminal device and at least one computational node for processing data;
deploying the at least one input node to a first group of edge nodes co-located with a first base station serving the at least one terminal device; and
deploying the at least one computational node to a second group of edge nodes co-located with an area data center.

2. The method according to claim 1, further comprising:
based on an association relationship between the at least one input node and the at least one terminal device, establishing a first data path between the at least one terminal device and the first group of edge nodes; and based on an association relationship between the at least one input node and the at least one computational node, establishing a second data path between the first group of edge nodes and the second group of edge nodes.

3. The method according to claim 1, further comprising:
in response to a movement of the at least one terminal device from a first cell provided by the first base station to a second cell provided by a second base station, migrating the at least one input node from the first group of edge nodes to a third group of edge nodes co-located with the second base station.

4. The method according to claim 3, further comprising:
based on the association relationship between the at least one input node and the at least one terminal device, establishing a third data path between the at least one terminal device and the third group of edge nodes; and
based on the association relationship between the at least one input node and the at least one computational node, establishing a fourth data path between the third group of edge nodes and the second group of edge nodes.

5. The method according to claim 1, wherein the first group of edge nodes and the second group of edge nodes are devices that implement a multi-access edge computing system.

6. The method according to claim 3, wherein the third group of edge nodes are devices that implement a multi-access edge computing system.

7. The method according to claim 1, wherein the application performs inference tasks by using a machine learning model and based on data from the at least one terminal device.

8. A system for deploying an application, comprising:
at least one processing unit; and
at least one memory which is coupled to the at least one processing unit and stores instructions for execution by the at least one processing unit, wherein the instructions, when executed by the at least one processing unit, cause the system to perform actions comprising:
acquiring a computational graph corresponding to an application, the computational graph comprising a plurality of nodes corresponding to operations performed by the application, and the plurality of nodes comprising at least one input node for exchanging data with at least one terminal device and at least one computational node for processing data;
deploying the at least one input node to a first group of edge nodes co-located with a first base station serving the at least one terminal device; and
deploying the at least one computational node to a second group of edge nodes co-located with an area data center.

9. The system according to claim 8, wherein the actions further comprise:
based on an association relationship between the at least one input node and the at least one terminal device, establishing a first data path between the at least one terminal device and the first group of edge nodes; and
based on an association relationship between the at least one input node and the at least one computational node, establishing a second data path between the first group of edge nodes and the second group of edge nodes.

10. The system according to claim 8, wherein the actions further comprise:
in response to a movement of the at least one terminal device from a first cell provided by the first base station to a second cell provided by a second base station, migrating the at least one input node from the first group of edge nodes to a third group of edge nodes co-located with the second base station.

11. The system according to claim 10, wherein the actions further comprise:
based on the association relationship between the at least one input node and the at least one terminal device, establishing a third data path between the at least one terminal device and the third group of edge nodes; and
based on the association relationship between the at least one input node and the at least one computational node, establishing a fourth data path between the third group of edge nodes and the second group of edge nodes.

12. The system according to claim 8, wherein the first group of edge nodes and the second group of edge nodes are devices that implement a multi-access edge computing system.

13. The system according to claim 10, wherein the third group of edge nodes are devices that implement a multi-access edge computing system.

14. The system according to claim 8, wherein the application performs inference tasks by using a machine learning model and based on data from the at least one terminal device.

15. A computer program product tangibly stored in a non-transitory computer storage medium and comprising machine-executable instructions that, when executed by a device, cause the device to perform a method for deploying an application, the method comprising:
acquiring a computational graph corresponding to an application, the computational graph comprising a plurality of nodes corresponding to operations performed by the application, and the plurality of nodes comprising at least one input node for exchanging data with at least one terminal device and at least one computational node for processing data;
deploying the at least one input node to a first group of edge nodes co-located with a first base station serving the at least one terminal device; and
deploying the at least one computational node to a second group of edge nodes co-located with an area data center.

16. The computer program product according to claim 15, further comprising:
based on an association relationship between the at least one input node and the at least one terminal device, establishing a first data path between the at least one terminal device and the first group of edge nodes; and
based on an association relationship between the at least one input node and the at least one computational node, establishing a second data path between the first group of edge nodes and the second group of edge nodes.

17. The computer program product according to claim 15, further comprising:
in response to a movement of the at least one terminal device from a first cell provided by the first base station to a second cell provided by a second base station, migrating the at least one input node from the first group of edge nodes to a third group of edge nodes co-located with the second base station.

18. The computer program product according to claim 17, further comprising:
based on the association relationship between the at least one input node and the at least one terminal device, establishing a third data path between the at least one terminal device and the third group of edge nodes; and
based on the association relationship between the at least one input node and the at least one computational node, establishing a fourth data path between the third group of edge nodes and the second group of edge nodes.

19. The computer program product according to claim 15, wherein the first group of edge nodes and the second group of edge nodes are devices that implement a multi-access edge computing system.

20. The computer program product according to claim 17, wherein the third group of edge nodes are devices that implement a multi-access edge computing system.

* * * * *